United States Patent [19]

Saeda et al.

[11] Patent Number: 5,221,824
[45] Date of Patent: Jun. 22, 1993

[54] WORK ROTATING APPARATUS FOR LASER MACHINING HAVING A HOLLOW OUTPUT SHAFT

[75] Inventors: Koichi Saeda, Higashiosaka; Shunji Sakura, Kyoto; Tatsuya Hirai, Itami; Yuko Sanada, Daito, all of Japan

[73] Assignee: Tsubakimoto Chain Co., Osaka, Japan

[21] Appl. No.: 891,881

[22] Filed: Jun. 1, 1992

[30] Foreign Application Priority Data

May 30, 1991 [JP] Japan .................. 3-48255[U]

[51] Int. Cl.⁵ ............................................. B23K 26/02
[52] U.S. Cl. .................................. 219/121.82; 219/159
[58] Field of Search ............... 219/121.82, 158, 159; 279/1 DC, 1 H

[56] References Cited

U.S. PATENT DOCUMENTS

| | | | |
|---|---|---|---|
| 3,913,819 | 10/1975 | Hirose et al. | 219/125 R X |
| 3,949,186 | 4/1976 | Nakayama et al. | 219/121.85 |
| 4,143,261 | 3/1979 | Eckart et al. | 219/121 |
| 4,177,371 | 12/1979 | Honig | 219/159 X |
| 5,075,527 | 12/1991 | Ikuma | 219/159 X |
| 5,079,401 | 1/1992 | Suchan | 219/121.68 |

Primary Examiner—C. L. Albritton
Attorney, Agent, or Firm—Howson & Howson

[57] ABSTRACT

A work rotating apparatus for laser machining has a reduction unit with input and output shafts, and a motor for rotating the input shaft. The output shaft is a hollow shaft having an axial through hole. A work holder, mounted on the output shaft, also has a through hole aligned with the through hole of the output shaft. A long workpiece can be held in the work holder with a part of the workpiece extending through the through hole of the work holder and into or through the through hole of the hollow output shaft. This enables the workpiece to be held more stably and securely, and allows the portion of the workpiece which is being machined to be positioned close to the work holder.

In one version, the reduction unit is supported by mounting legs, enabling the work to be positioned close to the laser machine table and farther from the laser head. In another version, the work rotating apparatus includes a frame, a supporting shaft mounted rotatably on the frame, and a reduction unit mounted on the supporting shaft so that the axis of rotation of the work can be tilted.

2 Claims, 6 Drawing Sheets

WORK ROTATING APPARATUS FOR LASER MACHINING HAVING A HOLLOW OUTPUT SHAFT

BRIEF SUMMARY OF THE INVENTION

This invention relates to improvements in work rotating apparatus for a laser machine tool, and more particularly to improvements whereby the work rotating apparatus is better able to handle long workpieces such as rods or bars.

In conventional laser processing machines, difficulties are encountered in machining elongated workpieces because the workpiece is mounted in cantilever fashion in the work holder. Unless the work holder is made extremely accurately, the end of the workpiece remote from the work holder may deviate from alignment with the axis of rotation of the workholder, with the result that the workpiece is inaccurately machined. Transverse forces generated by rotation of the workpiece may result in loosening of the workpiece, especially if the workpiece is assymetric or if it is not securely clamped in the work holder. Furthermore, if a workpiece extends too far from the work holder, a resulting unbalanced condition may cause rough operation of the work rotating machine.

The principal object of this invention is to avoid these problems by providing for more stable fixation of a workpiece in the work holder of a laser machine tool.

In accordance with the invention, the above-mentioned problems are addressed by providing a work rotating apparatus having a reduction unit with input and output shafts, and a motor for rotating the input shaft. The output shaft is a hollow shaft having an axial through hole. A work holder, mounted on the output shaft, has a through hole aligned with the through hole of the output shaft.

In one version of the invention, the reduction unit is supported by mounting legs. In another version, the work rotating apparatus includes a frame and a supporting shaft mounted rotatably on the frame. The reduction unit is mounted on the supporting shaft so that the axis of rotation of the work can be tilted.

The torque of the motor is transmitted to the output shaft through the reduction unit, and, because of the reduction mechanism disposed between the input shaft and the output shaft, the output shaft rotates more slowly than the input shaft. A workpiece held in the work holder mounted on the output shaft rotates, allowing the workpiece to be to be machined by a laser.

A long workpiece can be held in the work holder with a part of the workpiece extending through the through hole of the work holder and into or through the through hole of the hollow output shaft. This enables a long workpiece to be held more stably and securely, and allows the portion of the workpiece which is being machined to be positioned close to the work holder.

Further objects, details and advantages of the invention will be apparent from the following detailed description when read in conjunction with the drawings.

DETAILED DESCRIPTION

Figure 1:
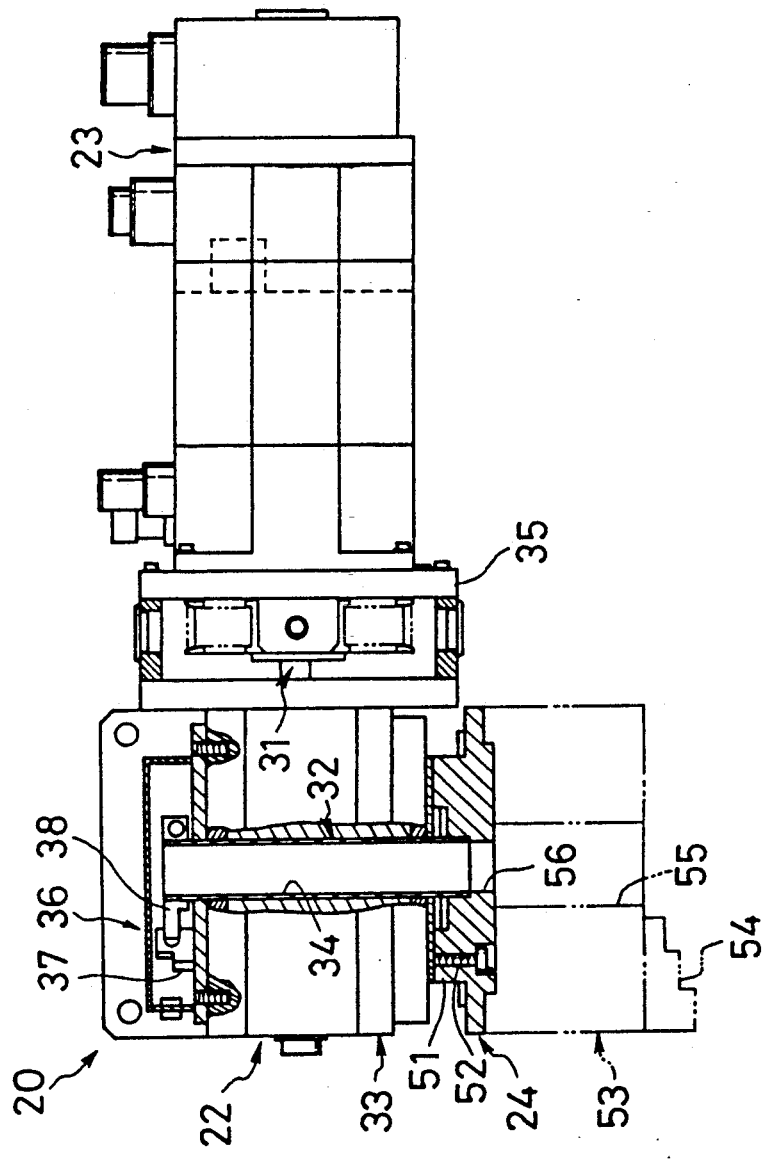
FIG. 1 is a partiality sectional top plan view of a work rotating apparatus according to an embodiment of the invention.
Figure 2:
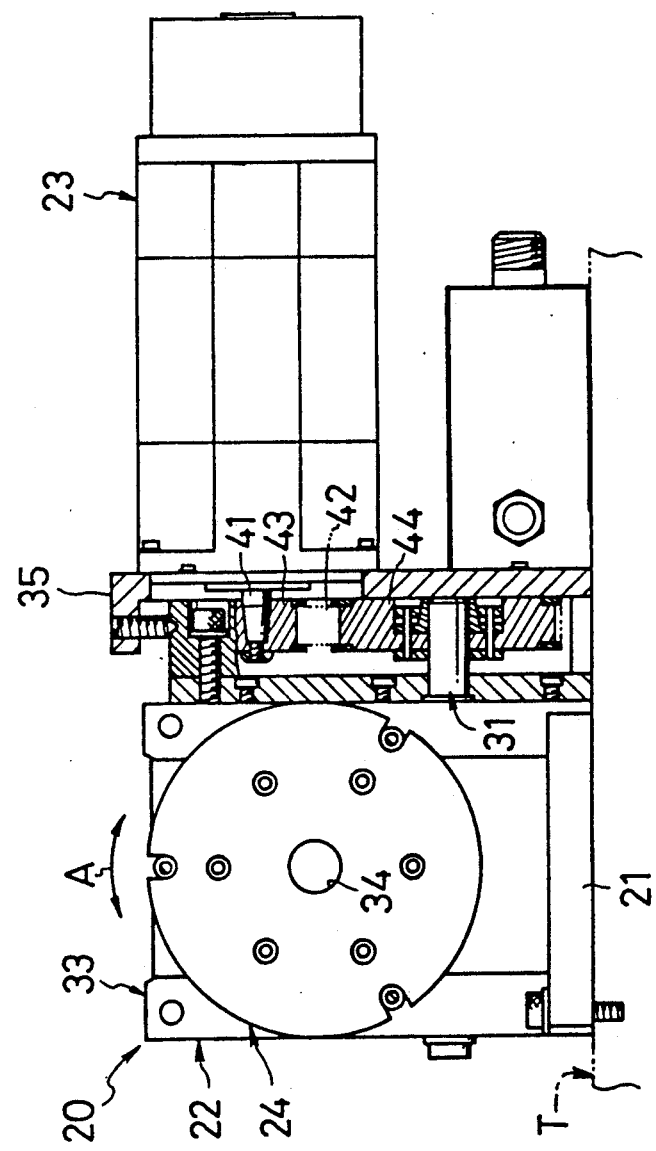
FIG. 2 is a partially sectional front elevational view of the work rotating apparatus of FIG. 1.
Figure 3:
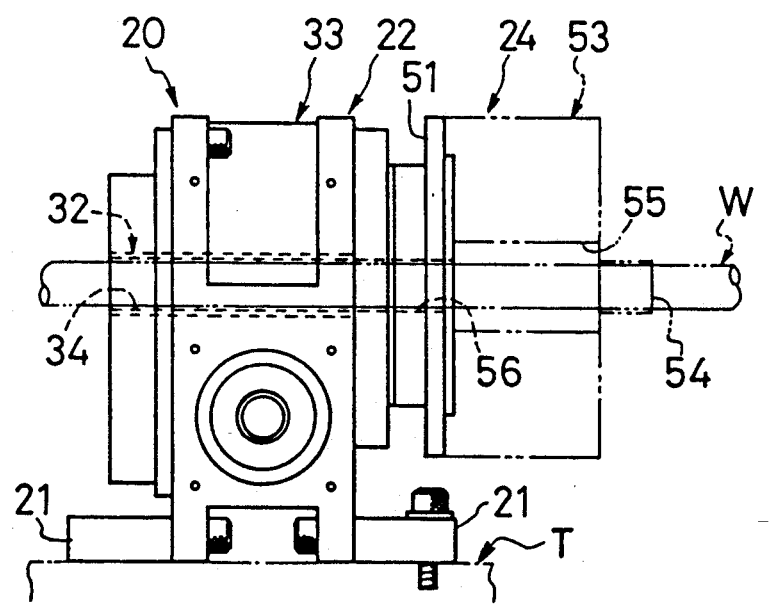
FIG. 3 is a left side elevational view of FIG. 2.

A work rotating apparatus 20 according to a first embodiment of the invention, illustrated in FIGS. 1 to 3, is mounted on a table T of a laser processing machine. The work rotating apparatus 20, comprises a pair of mounting legs 21, a servomotor 23 and a work holder 24.

A speed reduction unit 22 is supported by an aluminum housing 33 and has an input shaft 31 and an output shaft 32. Output shaft 32 is a hollow shaft having a through hole 34. Housing 33 is provided with a pair of laterally extending, plate-like support legs 21. Input shaft 31 and output shaft 32 are provided in housing 33 in crossing relationship to each other. The input and output shaft are preferably both approximately parallel with the top of table T of the laser processing machine.

In the reduction unit 22, a worm (not shown) mounted on input shaft 31 comes into mesh with plural needle rollers (not shown) which project radially from a cam follower (not shown) mounted on output shaft 32 so that the output shaft 32 rotates at a lower speed than that of input shaft 31. The inter-shaft distance between input shaft 31 and output shaft 32 is made slightly shorter than the normal inter-shaft distance in order to prevent backlash in the output shaft 32.

At one end of output shaft 32 there is provided an origin setting mechanism 36, as shown in FIG. 1. The origin setting mechanism 36 is used to set a origin position for rotation of the work, and detects overrotation of work holder 24. The origin setting mechanism comprises a proximity switch 37 provided in housing 33 and a switch actuating member 38 provided on output shaft 32.

As shown in FIG. 2A, a side plate 35 is attached to housing 33 of the work rotating reduction unit 22, and servomotor 23 is mounted on side plate 35.

An output shaft 41 of servomotor 23 is connected to input shaft 31 of reduction unit 22 through a toothed belt 42 and aluminum pulleys 43 and 44. The toothed belt and pulleys are positioned between side plate 35 and housing 33. The toothed belt 42 and pulleys 43 and 44 have interengaging teeth (not shown) which are formed so as to contact each other closely in order to prevent backlash.

A shown in FIG. 1, work holder 24 comprises a chuck support 51 mounted on output shaft 32 of reduction unit 22, and a conventional three jaw chuck 53 is bolted to support 51 by bolts, one of which is shown at 52. Chuck 53 is a self-centering chuck having three jaws 54 (only one of which is shown), which move together interdependently in order to grasp a workpiece. A chuck having independently movable jaws, such as a four-jaw chuck can also be used, as can other work-grasping devices. In chuck 53 and in chuck support 51, there are formed through holes 55 and 56 which are aligned with each other and with through hole 34 of output shaft 32.

The operation of this work rotating apparatus is as follows.

When servomotor 23 is operated, with a workpiece W held by chuck 53, the torque of the motor is transmitted to output shaft 32 through motor output shaft 41, pulley 43, toothed belt 42, pulley 44 and input shaft 31 of reduction unit 22. The work holder 24 can be made to rotate in either direction, as indicated by arrow A in FIG. 2. By virtue of the speed reduction afforded by reduction unit 22, work holder 24 is rotated at low speed by servomotor 23 so that laser machining can be carried out on the workpiece W.

In the case of a long workpiece W, as shown in FIG. 3, the work is inserted into holes 55, 56 of work holder 24 and hole 34 of output shaft 32. This allows the workpiece to be held by work holder 24 while extending entirely through the work rotating apparatus. Thus, even a very long workpiece the work can be held stably by work holder 24. Furthermore, as shown in FIG. 3, by supporting the workpiece W so that it extends through holes 55, 56 and 34, it is possible to balance the work, thereby smoothing the rotation of work holder 24 and making it possible to machine the work very accurately by means of a laser.

Since housing 33 of reduction unit 22 has mounting legs 21 connected directly to it, it is possible to position the work close to table T so that there is a wider space between the laser head and the work, which enhances the degree of freedom of processing.

A work rotating apparatus 120, according to a second embodiment of the invention, is illustrated in FIGS. 4–7. Elements corresponding to those in the work rotating apparatus of FIGS. 1–3 are indicated by using the corresponding numerals used in FIGS. 1–3, preceded by the numeral "1".

In work rotating apparatus 120, a work holder can be tilted to a desired angle manually by a handwheel.

The work rotating apparatus, which is also mounted on a table T of a laser machine tool, has a frame 125, a rotatable shaft 126, a reduction unit 122 for work rotation, a servomotor 123, a work holder 124, a work tilting reduction unit 128, and a handwheel 127.

Frame 125 is an L-shaped frame, having a mounting face 161 for mounting on the table T. A pair of bearings 163, provided in a hole 162 in an upstanding portion of the frame, support rotatable shaft 126 for rotation about a horizontal axis.

Frame 125 is provided with a conventional lock lever 164 for locking rotatable shaft 126 to frame 125.

Figure 4:
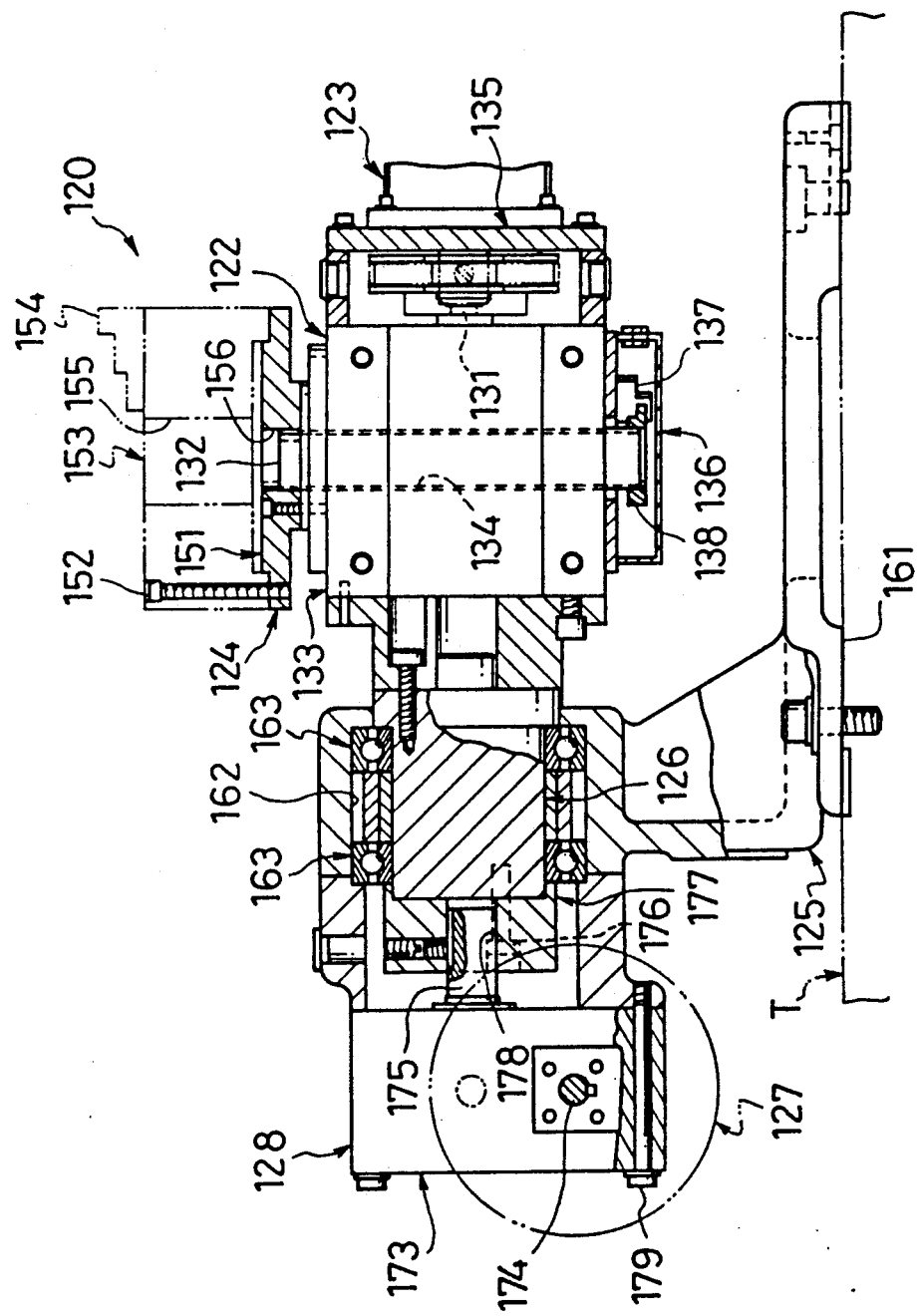
FIG. 4 is a partially sectional front elevational view of a work rotating apparatus according to another embodiment of the invention, with a drive motor portion only partially shown.
Figure 5:
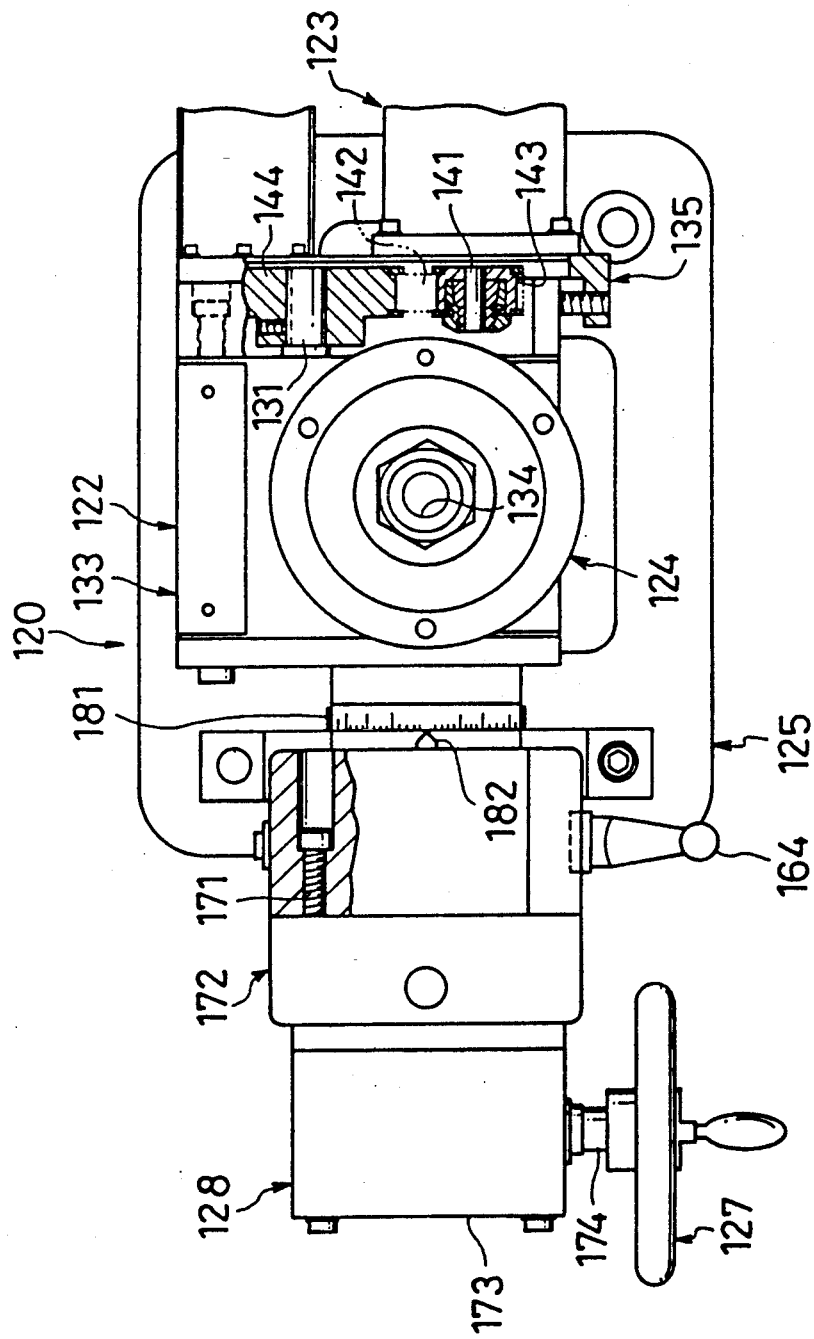
FIG. 5 is a partially sectional top plan view of FIG. 4.

A bracket 172 is mounted on a side face of frame 125 is mounted a bracket 172 by bolts 171, as shown in FIG. 5. A work tilting reduction unit 128 is mounted on the bracket by bolts 179, as shown in FIG. 4. In reduction unit 128, an input shaft 174 and an output shaft 175 are situated with their axes in crossing relationship within a cast iron housing 173. Handwheel 127 is mounted on input shaft 174 of the work tilting reduction unit 128. A connecting adapter 177 is mounted, by bolts 176, on an end portion of rotatable shaft 126, and output shaft 175 of reduction unit 128 is inserted into a central hole 178 of the connecting adapter. Adapter 177 and output shaft 175 are keyed together and secured by a set screw. Output shaft 175 of the work tilting reduction unit 128 and an output shaft 132 of the work rotating reduction unit 122 are disposed with their axes intersecting each other perpendicularly.

Bracket 172 and connecting adapter 177 press axially against the outer and inner races, respectively, of bearings 163, to eliminate backlash in the thrust direction.

The operation of this second embodiment is as follows.

First, lock lever 164 is operated to permit the rotation of rotatable shaft 126. Then, by turning handwheel 127 manually, rotatable shaft 126 is rotated by output shaft 175 of work tilting reduction unit 128, so that work rotating reduction unit 122 and work holder 124 tilt together. Work holder 124 is tilted slowly by the rotation of handwheel 127 by virtue of the speed reduction afforded by reduction unit 128. The angle of inclination of the axis of work-rotating output shaft can be read from graduations 181 (FIG. 5) on reduction unit 122 by means of pointer 182 provided on frame 125.

By returning lock lever 164 to its original position to lock shaft 126 to frame 125 when the work holder 124 has been tilted to a desired angle, the work holder may be fixed at the desired angle of inclination relative to frame 125.

Figure 6:
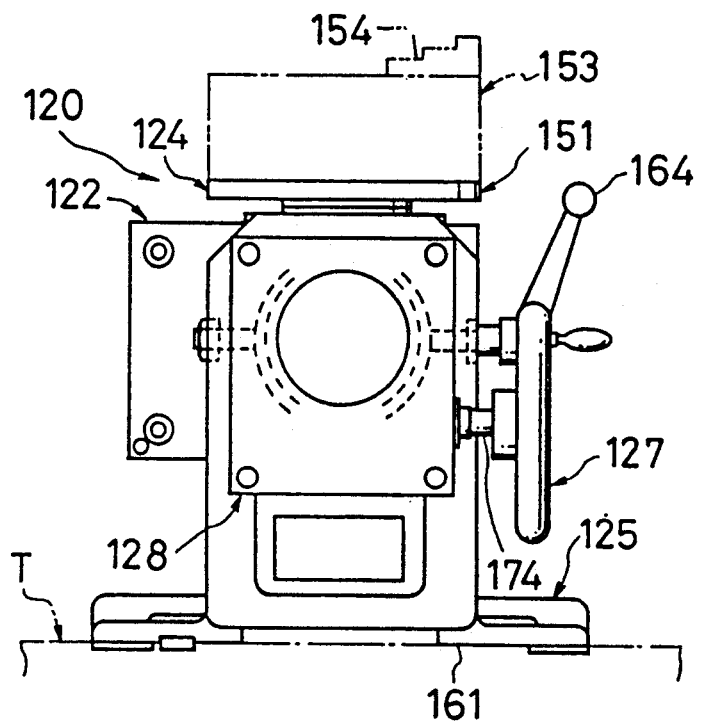
FIG. 6 is a schematic left side elevational view of FIG. 4.
Figure 7:
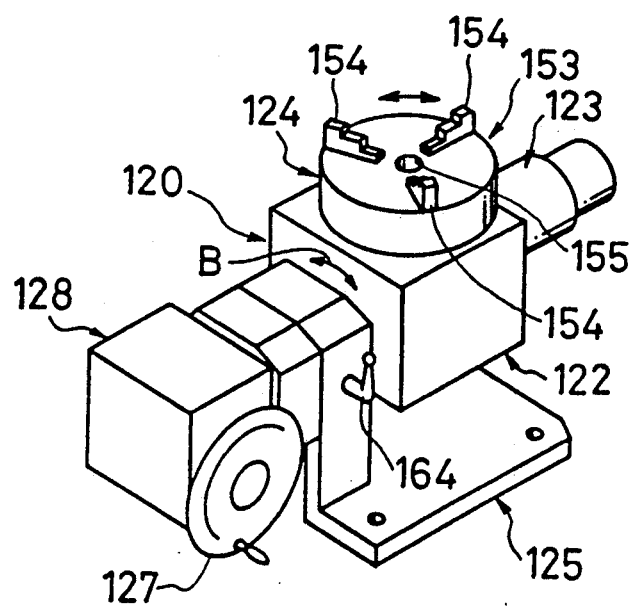
FIG. 7 is a schematic perspective view of the work rotating apparatus of FIG. 4.

When servomotor 123 is operated, with a workpiece W held by chuck 153, the torque of the motor is transmitted to output shaft 132 through motor output shaft 141, pulley 143, toothed belt 142, pulley 144 and input shaft 131 of the work rotating reduction unit 122, so that work holder 124 rotates. For example, if shaft 126 is locked in a condition such that work rotating shaft 132 is vertical, as shown in FIG. 6, the work will be rotated about a vertical axis. By virtue of the speed reduction afforded by reduction unit 122, the rotational speed of the servomotor is reduced so work holder 124 is rotated more slowly than servomotor 123.

In this way the work can be rotated for laser machining at any desired angle of inclination within a wide range on either side of vertical.

With work rotating apparatus 120, even a long workpiece can be held stably by work holder 124 by being inserted into through holes 155, 156 and 134.

If the work rotating reduction unit 122 is tilted 90° in either direction as indicated by arrow B (FIG. 7), for example if it is brought into a condition corresponding to that of the work rotating apparatus shown in FIG. 3, and the work is inserted through holes 155, 156 and 134, it is possible to secure the work in a weight balanced condition, so that the rotation of the work holder 124 becomes smooth and accurate laser machining can be carried out.

In the second embodiment, a servomotor (not shown) may be mounted, in place of handwheel 127, on input shaft 174 of work tilting reduction unit 128 to rotate shaft 126, thereby tilting work holder 124.

Further, the work tilting reduction unit can be eliminated and a lever (not shown) may be mounted directly on shaft 126 so that the shaft can be rotated by tilting the lever, thereby tilting the work holder 124.

With either version of the work rotating apparatus described above, even a long workpiece can be held stably by the work holder by being inserted through the through holes, and laser machining can be carried out as the work rotates.

Moreover, when the workpiece is inserted through the through holes and held in a horizontal state, it is possible to secure the work in a weight balanced condition, so that the rotation of the work holder becomes smooth, and accurate laser machining can be achieved.

With the work rotating apparatus of claim 1, in addition to the above effects, since the housing of the work rotating reduction unit is provided with mounting legs, it is possible to bring the work close the table of the laser machine. The space between the laser head and the rotating workpiece becomes wider, thus making it possible to increase the degree of freedom of processing.

We claim:

1. A work rotating apparatus for a laser machine tool, including:
    mounting legs;
    a reduction unit supported by said mounting legs; said reduction unit having an input shaft and an output shaft;
    motor means for rotating said input shaft; and
    a work holder mounted on said output shaft and rotatable thereby;
    said output shaft being a hollow shaft having a through hole extending axially therethrough and said work holder having a through hole aligned with the through hole of said output shaft.

2. A work rotating apparatus for a laser machine tool, including:
    a frame;
    a supporting shaft mounted rotatably on said frame;
    a reduction unit mounted on said supporting shaft, said reduction unit having an input shaft and an output shaft;
    motor means for rotating said input shaft; and
    a work holder mounted on said output shaft and rotatable thereby;
    said output shaft being a hollow shaft having a through hole extending axially therethrough and said work holder having a through hole aligned with the through hole of said output shaft.

* * * * *